US008655776B2

(12) United States Patent
Cheung et al.

(10) Patent No.: US 8,655,776 B2
(45) Date of Patent: Feb. 18, 2014

(54) BENEFITS CONTRACT PROVIDING A BUNDLE OF BENEFITS

(75) Inventors: Malcolm A. Cheung, Randolph, NJ (US); Robert A. Fishbein, Tenafly, NJ (US); Jacob M. Herschler, Southport, CT (US); N. David Kuperstock, Woodbridge, CT (US); Robert F. O'Donnell, Harwinton, CT (US); Steven L. Putterman, West Hartford, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 1621 days.

(21) Appl. No.: 11/456,930

(22) Filed: Jul. 12, 2006

(65) Prior Publication Data

US 2007/0021986 A1    Jan. 25, 2007

Related U.S. Application Data

(60) Provisional application No. 60/701,096, filed on Jul. 19, 2005.

(51) Int. Cl.
*G06Q 40/00* (2012.01)
(52) U.S. Cl.
USPC .............................................. 705/40; 705/35
(58) Field of Classification Search
USPC .................................................. 705/4, 35–40
See application file for complete search history.

(56) References Cited

U.S. PATENT DOCUMENTS

| | | | |
|---|---|---|---|
| 5,752,237 A * | 5/1998 | Cherny | 705/4 |
| 6,161,096 A | 12/2000 | Bell | 705/4 |
| 6,609,111 B1 | 8/2003 | Bell | 705/36 |
| 7,305,347 B1 * | 12/2007 | Joao | 705/1 |
| 2002/0128877 A1 * | 9/2002 | Levit | 705/4 |
| 2003/0083907 A1 * | 5/2003 | Sato | 705/4 |

FOREIGN PATENT DOCUMENTS

IT    PCT/IT00/0009    * 3/2000

OTHER PUBLICATIONS

S. Travis Prichett et al., "Risk Management and Insurance" West Publishing Company, Seventh Edition, pp. 104.*
Slide presentation, "Planning for your carefree retirement," white papers, Lincoln Financial Group®, L02-0277-LL 14 pages, Apr. 2002.
Slide presentation, MoneyGuard®, white papers, Lincoln Financial Group®, L03-0337-LL, 20 pages, Rev. Feb. 2003.
Policy Form, "MoneyGuard® Life Insurance for Living," Lincoln Financial Group®, Rider Form LL-2020 series, Rider Form LL-2800 series, LM0312-0621, Male, 15 pages, Mar. 24, 2005.

(Continued)

*Primary Examiner* — Thu Thao Havan
(74) *Attorney, Agent, or Firm* — Baker Botts L.L.P.

(57) ABSTRACT

According to one embodiment of the invention, a benefits contract includes an agreement to provide a plurality of benefits for at least one person. The agreement provides for an account including a plurality of units. Each unit is associated with multiple benefits. For example each unit may be associated with multiple benefits such as life insurance, health insurance, supplemental health insurance, long-term care insurance, short-term disability insurance, long-term disability insurance, prescription drug insurance, a plurality of income payments, a withdrawal benefit, an annuity, a property and casualty benefit, or other similar benefits. The agreement is such that a person associated with the benefits contract may choose to exercise a particular unit, or fraction thereof, to receive only one of the three or more benefits; and such that the benefits account (or plurality of units) may be purchased tax-free using funds from a tax-deferred retirement account.

22 Claims, 4 Drawing Sheets

(56) References Cited

OTHER PUBLICATIONS

Policy Form, "MoneyGuard® Life Insurance for Living," Lincoln Financial Group®, Rider Form LL-2020 series, Rider Form LL-2800 series, LM0312-0621, Female, 15 pages, Mar. 24, 2005.
White Paper, "Underwriting Guidelines," MoneyGuard® Series, Lincoln Financial Group®, L02-0210-LL, 2 pages, Mar. 2002.
White Paper, "Top Ten MoneyGuard® Questions," Lincoln Financial Group®, LFD0502-0211, 2 pages, Undated.
White Paper, "Underwriting Impairment Guide for MoneyGuard® Product Series," Lincoln Financial Group®, L02-0211-LL, 2 pages, Oct. 2002.
Brochure, Product and Sales Guide for MoneyGuard®, MoneyGuard® LS, MoneyGuard® Flex I, and MoneyGuard® Flex II, Lincoln Financial Group®, L01-0193-LL, 22 pages, Jun. 2002.
Rider Brochure, "Convalescent Care Benefits Rider," "Extension of Convalescent Care Benefits Rider," white paper, Lincoln Financial Group®, LL-2800AA, 15 pages, Jun. 2002.
Rider Brochure, "Extension of Convalescent Care Benefits Rider," white paper, Lincoln Financial Group®, LL-2820AA, 4 pages, Jun. 2002.
Brochure, "Flexible Premium Adjustable Life Insurance Policy, Adjustable Death Benefit," and "Guarantee Enhancement Rider," Lincoln Financial Group®, LL-2020AA, 14 pages, Jun. 2002.
Cropper, C.M., "A Combo Policy for Long-Term Care," BusinessWeek online, 2 pages, May 2, 2005.

\* cited by examiner

BENEFITS CONTRACT PROVIDING A BUNDLE OF BENEFITS

RELATED APPLICATIONS

This application claims the benefit under 35 U.S.C. §119 (e) of U.S. Provisional Application Ser. No. 60/701,096 filed Jul. 19, 2005.

TECHNICAL FIELD OF THE INVENTION

This invention relates generally to benefits contracts and more particularly to a benefits contract providing a bundle of benefits.

BACKGROUND OF THE INVENTION

There are a variety of benefits contracts available on the market and these benefits contracts are typically purchased to provide some level of security against one or more potential risks. A benefits contract may also have an investment function, such as, for example, in the case of an annuity. For example, life insurance contracts typically provide financial security for family members in the event of a person's death. Similarly, health insurance typically provides security against the potentially high costs of an illness or injury. Long-term care benefits typically provide security against the potentially high cost of such care. These and other benefits contracts serve to pass the risk of an unknown event from one party to another, typically in exchange for a fee.

Although there are many different types of benefits contracts available, customers must select the appropriate contract or combination of contracts to provide the most utility with limited resources. Often, it may not be possible to purchase all of the benefits contracts that a consumer may desire, due to limited financial resources. In addition, some consumers are reluctant to purchase certain types of benefits contracts out of fear that they will make payments for a contract for which they will never receive any return. For example, a consumer may purchase a long-term care benefit for a considerable amount of money and die without ever having a need for long-term care.

SUMMARY OF THE INVENTION

According to one embodiment of the invention, a benefits contract includes an agreement to provide a plurality of benefits for at least one person. The agreement provides for an account including a plurality of units. Each unit is associated with multiple benefits. For example each unit may be associated with multiple benefits such as life insurance, health insurance, supplemental health insurance, long-term care insurance, short-term disability insurance, long-term disability insurance, prescription drug insurance, a plurality of income payments, a withdrawal benefit, an annuity, a property and casualty benefit, or other similar benefits. The agreement is such that a person associated with the benefits contract may choose to exercise a particular unit, or fraction thereof, to receive only one of the three or more benefits; and such that the benefits account (or plurality of units) may be purchased tax-free using funds from a tax-deferred retirement account.

According to another embodiment of the invention, a benefits contract includes an agreement to provide a plurality of benefits that may be elected. The plurality of benefits includes different types of benefits, and at least some of the plurality of benefits include an election period including a start date. There may be a delay between the election period start date for at least one of the plurality of benefits and the election period start date for a second one of the plurality of benefits. The election period may denote a time period during which it is permissible to elect a benefit.

Certain embodiments of the present invention may provide various technical advantages. For example, certain embodiments may allow a customer to purchase contracts with units that may be selectively used in the future to elect multiple benefits. In some embodiments, these units may be purchased at multiple points in time. Certain embodiments may provide flexibility by allowing a customer to choose when to purchase benefit units, how much to purchase, when to exercise the benefits, and which benefits to exercise. Certain embodiments may simplify the decision making process related to purchasing multiple benefits by allowing the customer to purchase units that can be used to elect multiple benefits and then wait to determine which benefits to elect until a later time, such as when a need for the benefit arises or is anticipated. Certain embodiments may also reduce costs associated with providing a bundle of benefits by limiting the time in which one or more benefits may be exercised.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE EXAMPLE EMBODIMENTS

It should be understood at the outset that although example implementations of embodiments of the invention are illustrated below, the present invention may be implemented using any number of techniques, whether currently known or not. The present invention should in no way be limited to the example implementations, drawings, and techniques illustrated below.

Figure 1:
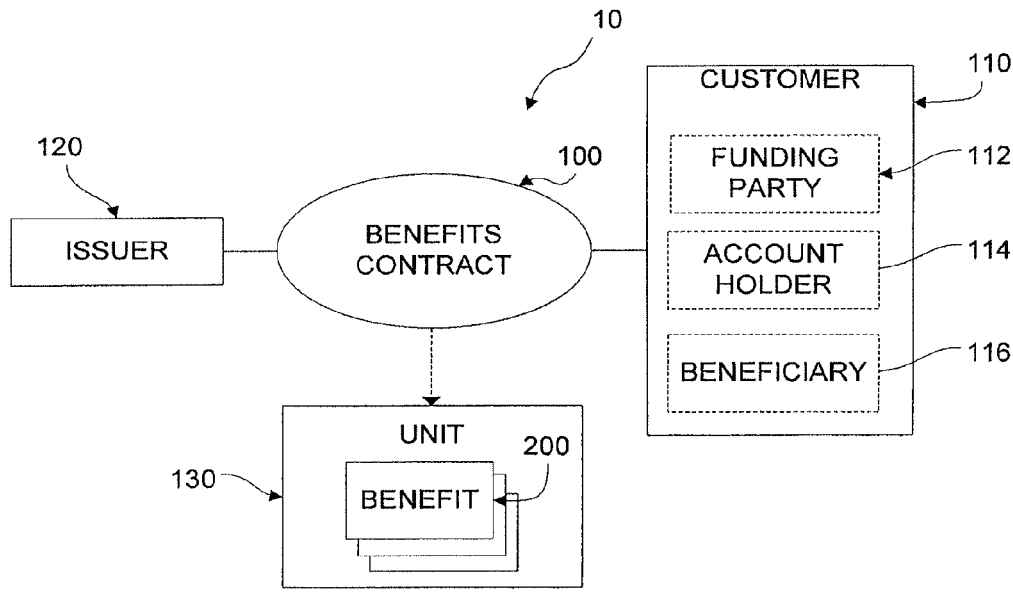
FIG. 1 illustrates a system for providing a benefits contract according to a particular embodiment of the present invention.

FIG. 1 illustrates a system 10 for providing benefits contract 100 according to a particular embodiment of the present invention. System 10 may interact with customer 110 and issuer 120; and system 10 may utilize one or more units 130. Each unit 130 may represent an amount of each of a plurality of benefits 200. Benefits contract 100 may represent a contract between customer 110 and issuer 120. According to certain embodiments, system 10 may be utilized to provide benefits contract 100 to customer 110, through the use of multiple units 130, each representing an amount of each of a plurality of benefits 200. Each unit 130 may be exercised to elect a particular one of the plurality of benefits 200 in the amount specified.

Benefits contract 100 may represent an agreement or a group of agreements between one or more customers 110 and one or more issuers 120, for the one or more issuers 120 to provide multiple benefits 200 to the one or more customers 110. For example, in certain embodiments, benefits contract 100 may represent an agreement between customer 110 and issuer 120 to provide one of three electable benefits 200 for customer 110.

In certain embodiments, for example but not by way of limitation, customer 110 may purchase ten units in year one. Each of the units 130 may represent, for example, five benefits 200. In year ten, an election may be made to utilize two units 130 for the first benefit 200. This would leave eight units 130 which could be exercised at a later date. In year fourteen, an election may be made to exercise six units 130 for the second benefit 200. This would leave two units 130 which could be exercised at a later date. In year twenty, three additional units 130 may be purchased, for a total of five units which can be exercised. In year thirty, an election may be made to exercise four units for the second benefit 200 and one unit for the fifth benefit 200. At this point, all of the units would be exhausted and benefits contract 100 may terminate. This example is just one possible scenario for a particular embodiment of the present invention and is not intended as a limitation.

Customer 110 may broadly refer to one or more of a funding party 112, an account holder 114, a beneficiary 116, and/or an agent or other third party acting on behalf of one of these. Funding party 112 may broadly represent an entity or group of entities providing funds to purchase or fund benefits contract 100. Account holder 114 may broadly represent an entity or group of entities whose risk is mitigated by benefits contract 100. Beneficiary 116 may broadly refer to an entity or group of entities who receive one or more financial transfers (or other transfers of consideration) pursuant to provisions of benefits contract 100. For example, in certain embodiments, beneficiary 116 may be an entity that account holder 114 identifies as an intended recipient of proceeds upon the death of account holder 114. As another example, in certain embodiments, beneficiary 116 may be a health care provider who may be reimbursed for providing health care to account holder 114. In certain embodiments, one or more of funding party 112, account holder 114, and beneficiary 116 may be the same entity or group of entities. For example, funding party 112 and account holder 114 may be the same. As another example, account holder 114 and beneficiary 116 may be the same. In certain embodiments, funding party 112 may be an individual, a business entity, or a government entity. For example, funding party 112 may be an employer of an account holder 114. In certain embodiments, account holder 114 and beneficiary 116 may be related. For example, account holder 114 and beneficiary 116 may be related as husband and wife. In certain embodiments, two individuals, such as a married couple, may both be account holders 114. In certain embodiments, beneficiary 116 may be different for different benefits 200. For example, for one benefit 200 account holder 114 may also be beneficiary 116 and for another benefit 200 the spouse of account holder 114 may be beneficiary 116.

While this patent describes various actions, benefits, steps, etc. in relation to a customer 110, funding party 112, account holder 114, and/or beneficiary 116, those descriptions should not be construed as limiting because benefits contract 100 (or controlling laws or regulations) might provide for various persons to exercise control, take various actions, receive certain benefits, and/or affect certain features with regard to benefits contract 100.

Issuer 120 may represent an entity that provides and/or sells benefits contract 100 to customer 110. In certain embodiments, issuer 120 may represent a government entity or a business entity, such as a bank or an insurance company. Issuer 120 may also represent multiple entities that operate together to provide or sell benefits contract 100.

Unit 130 may broadly refer to an accounting unit used to track the coverage for account holder 114, according to the provisions of benefits contract 100. In certain embodiments, each unit 130 may represent exercisable benefits coverage provided for account holder 114. For example, (but not by way of limitation) funding party 112 may purchase, and issuer 120 may allocate, one-hundred units 130 to account holder 114. In certain embodiments, the one-hundred units 130 may provide a certain electable level of coverage for account holder 114 for each of a plurality of benefits 200. Each unit 130 may be associated with multiple benefits 200. In certain embodiments, each unit 130 provides customer 110 with the right and/or option to exercise the unit 130 and thereby utilize one of the benefits 200 associated with that unit 130 in accordance with the terms of benefits contract 100.

In certain embodiments, benefits contract 100 may provide for multiple classes of units 130. For example, different classes of units 130 may be associated with different groups or combinations of benefits 200. As another example, different classes of units 130 may represent different tax treatments for the units 130. As yet another example, different classes of units 130 may represent different payment structures for the units 130, such as lump sum, periodic payment, etc. In certain embodiments, different classes of units 130 may be associated with the age of account holder 114 at the time that units 130 are purchased. In certain embodiments, different classes of units 130 may represent certain characteristics of one or more account holders 114, such as gender, underwriting class, health, medical history, family history, and/or participation in one or more activities (e.g., smoking, high risk activities, etc.). For example, in a particular embodiment, benefits contract 100 may include two account holders 114 and different classes of units 130 may be purchased for each account holder 114.

In certain embodiments, units 130 may represent (or be proportional to) either a purchase dollar value and/or a proceed dollar value for one or more benefits 200. For example, one unit 130 may represent a one dollar incremental investment associated with benefits contract 100. Although, units 130 have been described as representing dollar values, in other embodiments, units 130 may represent one or more values in any incremental currency. In certain embodiments, units 130 may represent (or be proportional to) a fractional currency value and/or the value represented by unit 130 may change over time.

In certain embodiments, benefits contract 100 may provide that account holder 114 must exercise at least one complete unit 130 at a time. Alternatively, in certain embodiments, account holder may exercise a fraction of a unit 130 and/or exercise multiple units 130 together with a fraction of a unit 130. For example, (but not by way of limitation) in certain embodiments, account holder 114 may exercise 20.25 units at one time.

Benefit 200 may broadly refer to an instrument or agreement to transfer risk from one entity to another, including investment vehicles such as annuities. According to certain embodiments of the present invention, benefits contract 100 may be associated with multiple types or categories of benefits 200. In certain embodiments, each type or category of benefit 200 may serve to transfer a different type or category of risk.

Figure 2:
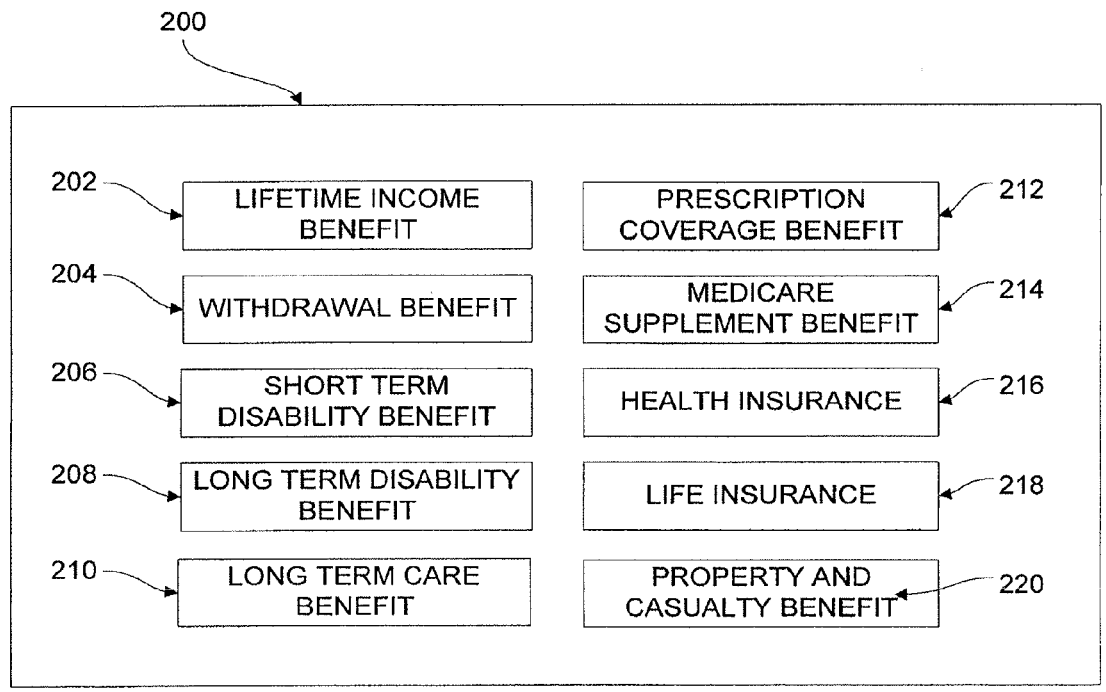
FIG. 2 illustrates example benefits according to a particular embodiment of the present invention.

FIG. 2 illustrates example benefits 200 that may be associated with a unit 130 according to a particular embodiment of the present invention. As shown, benefits 200 may include: life income benefit 202 (which could be an annuity), withdrawal benefit 204, short-term disability benefit 206, long-term disability benefit 208, long-term care benefit 210, prescription coverage benefit 212, Medicare supplement benefit 214, health insurance 216, life insurance 218, and/or property and casualty benefit 220. The example benefits 200 illustrated in FIG. 2 are intended to indicate generally an example of the types and categories of benefits 200 that may be covered by benefits contract 100. The example benefits 200 illustrated in FIG. 2 are not intended to be an exclusive list. The present invention contemplates other benefits 200 beyond those included within FIG. 2. For example, benefits 200 may also include an income benefit for a term of years. As another example, in certain embodiments, benefits 200 may include (and/or benefits contract 100 may be associated with another agreement that includes) property and casualty coverage. (For example, in a particular embodiment, benefits contract 100 may be associated with an umbrella liability agreement which includes property and casualty coverage.) As yet another example, in certain embodiments, benefits 200 may include an accumulation benefit guaranteeing, for example, that an asset or account will have at least a certain non-zero value at a future point in time. (For example, in a particular embodiment, an accumulation benefit may guarantee a future value for an account with at least a portion of the account assets invested in one or more equities.) Although a variety of example benefits are described herein, the present invention contemplates other appropriate benefits being associated with one or more units 130 and/or benefits contract 100.

Lifetime income benefit 202 may broadly represent a plurality of income payments that may be transferred to beneficiary 116 (or multiple beneficiaries 116) on a periodic basis during the lifetime of one or more designated lives. In certain embodiments, a designated life may be the life of account holder 114 or the life of beneficiary 116. In certain embodiments, lifetime income benefit 202 may be tied to and/or behave similar to a fixed or variable annuity. For example, upon an election to exercise one or more units 130 to utilize as lifetime income benefit 202, issuer 120 may transfer a certain amount of funds to an immediate annuity (or simply make payments according to an annuity) which will then be annuitized to provide a plurality of income payments. In some embodiments, a deferred annuity could be elected with one or more units 130.

Withdrawal benefit 204 may broadly represent an income source that may be discretionarily withdrawn by beneficiary 116. In certain embodiments, these discretionary withdrawals may be limited to a specified amount and/or to a specified period of time. For example, in certain embodiments, the specified period of time may be related to the life of account holder 114. In certain embodiments, withdrawal benefit 204 may be tied to and/or behave similar to a deferred annuity.

Short-term disability benefit 206 may broadly represent income protection against a disability, the term of which may be relatively limited in duration. In certain embodiments, the disability may be due to an accident, sickness, etc. In certain embodiments, payments made pursuant to short-term disability benefit 206 may be contingent upon account holder 114 being admitted under the care of a medical care provider. In certain embodiments, the maximum period of the coverage, the initial date of eligibility, and the payment amount may vary depending on the number of units 130 elected, the age of account holder 114, and/or the previous income of account holder 114. The invention thus may allow the exercise of certain units 130 (or fractions thereof) by account holder 114 when he becomes disabled to elect short-term disability benefit 200. If the account holder never becomes disabled, then account holder 114 may use his units for other benefits 200.

Long-term disability benefit 208 may broadly represent income protection against an extended period of disability. In certain embodiments, the disability may be due to an accident or sickness. In certain embodiments, payments made pursuant to long-term disability benefit 208 may be contingent upon account holder 114 being admitted under the care of a medical care provider. In certain embodiments, the maximum period of the coverage, the initial date of eligibility, and/or the payment amount may vary depending on the number of units 130 elected, the age of account holder 114, and/or the previous income of account holder 114. In certain embodiments, election of this benefit 200 may be made when needed in some embodiments similar to the election discussed above for short-term disability benefit 206.

Long-term care benefit 210 may broadly represent protection against expenses associated with care provided for an extended duration (or may represent the provision of such long-term care). For example, long-term care benefit 210 may provide financial assistance (or in-kind assistance) to at least partially offset the costs associated with medical or support services. In certain embodiments, the need for such care may be due to disability or age. For example, account holder 114 may require care as a result of a loss of some or all capacity to function. In certain embodiments, payments made to pursuant to long-term care benefit 210 may cover the costs of assisted living arrangements, home health care, nursing home care, and/or psychiatric institutionalization. For example, long-term care benefit 210 may cover the costs of providing help with everyday activities such as eating, bathing, and/or dressing. In certain embodiments, election of this benefit 200 may be made when needed in some embodiments similar to the election discussed above for short-term disability benefit 206.

Prescription coverage benefit 212 may broadly represent protection against expenses associated with the costs of medically prescribed drugs or devices. In certain embodiments, prescription coverage benefit 212 may be limited to expenses associated with certain categories of prescribed drugs or devices. In some embodiments, the benefit may provide drugs or devices to beneficiary 116, rather than reimbursement or payment for the same.

Medicare supplement benefit 214 may broadly represent protection against healthcare expenses not covered by Medicare or another government subsidized healthcare coverage. For example, Medicare supplement benefit 214 may cover the costs associated with Medicare co-payments and/or co-insurance, the costs arising after Medicare coverage is exhausted, the costs associated with recovery from an illness, injury, or surgery, and/or the costs associated with healthcare expenses in a foreign country. In certain embodiments, the scope, value, and duration of Medicare supplement benefit 214 may vary.

Health insurance 216 may broadly represent protection against a wide variety of health care costs. For example, in certain embodiments, health insurance 216 may cover costs associated with expenses resulting from injury or illness. In certain embodiments, health insurance 216 may cover a wide variety expenses associated with illness and injury, including but not limited to hospitalization, surgery, physician's fees, medicines, testing, imaging, radiation therapy, maternity and nursing care, eyeglasses and/or contact lenses, crutches, and/or prosthesis. In some embodiments, such benefits might be provided in-kind.

Life insurance 218 may broadly represent an agreement to make a financial distribution to beneficiary 116 upon the death of account holder 114. In certain embodiments, the financial distribution may be in the form of one or more securities. In certain embodiments, upon the death of account holder 114 financial distributions pursuant to life insurance 218 may be a lump sum payment or a periodic income stream. In certain embodiments, multiple beneficiaries 116 may receive financial distributions following the death of an individual account holder 114. In certain embodiments, life insurance 218 may include a second to die provision.

Property and casualty benefit 220 may broadly represent protection against expenses associated with personal property loss (or damage) and/or personal liability. For example, in certain embodiments, property and casualty benefit 220 may represent protection against expenses arising from damage to a home or automobile.

In certain embodiments, each unit 130 includes a combination of multiple benefits 200. For example, each unit 130 may allow for account holder 114 to exercise units 130 and thereby utilize one or more of the multiple benefits 200.

In certain embodiments, but not by way of limitation, benefits contract 100 may provide that multiple benefits 200 are associated with each unit 130, but that the number and combination of benefits 200 associated with each unit 130 may change over time. For example, in certain embodiments, a single unit 130 may be associated with short-term disability benefit 206, prescription coverage benefit 212, and life insurance 218 for the first interval after the single unit 130 is purchased. Then, according to this example, for the second interval the single unit 130 may be associated with short-term disability benefit 206, long-term disability benefit 208, prescription coverage benefit 212, and life insurance 218. And then, according to this example, for the third interval, the single unit 130 may be associated with lifetime income benefit 202 and long-term care benefit 210. In certain embodiments, the benefits 200 associated with certain units 130 may differ from benefits 200 associated with other units 130. For example, the differences may be tied to the purchase date (or the age of account holder 114 at the time of purchase) for the units 130 and/or a class in which the units 130 are included.

In operation, benefits contract 100 may provide for customer 110 to purchase units 130, each associated with multiple benefits 200. Benefits contract may further provide that customer 110 may later exercise one or more of the purchased units 130 and, in exercising the one or more purchased units 130, may receive one of the benefits 200 associated with each unit 130. In certain embodiments, customer 110 may wait until the need arises (or is anticipated) which necessitates the utilization of one or more benefits 200 before exercising units 130 to utilize those benefits 200. For example, customer 110 may purchase one-hundred units 130 in year one and then, upon sustaining a disabling injury in year ten, may exercise fifty units 130 to utilize those units as long-term disability benefit 206. The remaining units of customer 110 may be saved to exercise in the future. In certain embodiments, the exercise of one or more units 130 (and/or the utilization of one or more benefits 200) by customer 110 may be subject to one or more eligibility requirements.

In certain embodiments, if one or more purchased units 130 have not been exercised upon the death of account holder 114, the unexercised units may be automatically exercised to utilize a default benefit 200, the unexercised units may be transferred to another account holder 114, the unexercised units 130 may lapse, the unexercised units may be transferred to a charitable institution, and/or some combination of these. For example, if account holder 114 purchases one-hundred units in year one and then account holder 114 dies in year twenty without exercising fifty units 130, the remaining units 130 may be exercised to utilize those units 130 as life insurance 218 by default.

In certain embodiments, benefits contract 100 may provide that, for one or more benefits 200 associated with a unit 130, there is a delay between the date that the unit 130 is exercised and the date that the elected benefit 200 may be utilized. For example, (but not by way of limitation) in certain embodiments, if a unit 130 is exercised to utilize lifetime income benefit 202 on Jan. 1, 2005, the income payments provided for under the provisions of lifetime income benefit 202 may not begin until Jan. 1, 2007. Such time delays after exercise may apply to other types of benefits as well. The time delays may be different (or zero) for different benefits.

In certain embodiments, customer 110 may purchase units 130 using pre-tax funds subject to applicable law. For example, customer 110 may purchase units 130 (and/or benefits contract 100) tax-free using proceeds from a retirement account, depending upon applicable law. As another example, an employer may purchase units 130 for an employee such that the units are not considered a taxable benefit depending upon applicable law. Alternatively, units 130 may be purchased using funds, all or a portion of which are taxable or after tax. For example, a certain amount of units 130 may be purchased using pre-tax funds and the remaining units 130 may be purchased using after-tax funds. In certain embodiments, units 130 purchased pursuant to benefits contract 100 may be considered a tax deferred investment.

In certain embodiments, units 130 may be purchased up front, in multiple installments, on a continuing periodic basis, at random times, or any combination thereof. For example, (but not by way of limitation) customer 110 may purchase one-hundred units 130 in year one for one-hundred dollars, with additional one-hundred dollar payments being required every year for ten years to maintain the units 130. In certain embodiments, the cost associated with units 130 may vary over time. For example, the cost for one-hundred units 130 may increase or decrease over time based upon the age of account holder 114, a change in one or more risk factors for account holder 114 (such as health status), the length of time since other units were purchased, and/or the performance of an external index. In certain embodiments, benefits contract 100 may provide that the way in which units 130 are funded may be converted at the election of account holder 114 or upon the happening of an event. For example, a variable periodic payment for units 130 may be converted at the election of account holder 114 to a fixed periodic payment or to a lump sum payment. In some embodiments, various numbers of units 130 may be purchased with lump sums at various points in time.

In certain embodiments, issuer 120 and/or benefits contract 100 may allow for a benefit 200, that is not included within benefits contract 100, to be converted to a benefit 200 within benefits contract 100. For example, issuer 120 may offer both benefits contract 100, including long-term care benefit 210, and may also offer a separate long-term care benefit. In this example, issuer 120 may allow a customer 110 who has purchased the separate long-term care benefit to convert the separate long-term care benefit to a specified number of units 130 under benefits contract 100. Conversely, in certain embodiments, issuer 120 and/or benefits contract 100 may allow for a benefit 200 that is included within benefits contract 100 to be converted to a benefit 200 that is not included within benefits contract 100 (or for units 130 to be so converted). In some embodiments, some or all types of conversions may be prohibited, either by contract or by law or regulation.

In certain embodiments, issuer 120 and/or benefits contract 100 may allow for one or more units 130 (or a value based on units 130) to be transferred from one benefits contract 100 to another benefits contract 100 and/or another type of benefits agreement. For example, if account holder 114 is an employee and funding party 112 is an employer, if account holder 114 changes jobs, units 130 may be transferred or "rolled over" to another benefits contract 100 associated with the new employer of account holder 114 (or with the account holder 114 himself). As another example, in certain embodiments, account holder 114 may transfer all or a portion of units 130 (or a value based on units 130) to a benefits contract 100 associated with another issuer 120, or to another benefits agreement entirely. In all cases, the ability to transfer may be restricted by contract, law or regulation.

In certain embodiments, benefits contract 100 may allow for one or more of certain benefits 200 to be added to or subtracted from coverage under one or more units 130. For example, in certain embodiments, customer 110 may choose (and/or purchase) additional benefits 200 to be associated with all or a portion of purchased units 130. As another example, in certain embodiments, customer 110 may choose to remove one or more benefits 200 from association with those units 130. In these embodiments, choices to add or subtract one or more of certain benefits 200 from coverage may or may not correspond to a change in the price of units 130 and/or benefits contract 100. Similarly, in these embodiments, choices to add or subtract one or more of certain benefits 200 from coverage may or may not correspond to a change in the utilizable value of one or more benefits 200. In certain embodiments, choices to add or subtract one or more of certain benefits 200 may be made at the discretion of issuer 120.

In certain embodiments, the utilizable value of one or more benefits 200 associated with a unit 130 may be fixed at the time that the unit 130 is purchased. For example, in a particular embodiment, customer 110 may purchase fifty units 130, each associated with three benefits 200. In this particular embodiment, for example, the benefits 200 include lifetime income benefit 202, long-term care benefit 210, and life insurance 218. Upon the purchase of units 130, the utilizable value of each benefit 200 associated with each unit 130 is fixed. Each unit 130 exercised as lifetime income benefit 202 may provide, for example, financial distributions of $100 per month until death. Each unit 130 exercised as long-term care benefit 210 may provide, for example, long-term care reimbursements of up to $500 per month for a specified period of months. Each unit 130 exercised as life insurance 218 may, for example, distribute $1,000 in proceeds to beneficiary 116 according to the terms of life insurance 218.

In certain embodiments, the utilizable value of one or more benefits associated with a unit 130 may vary based upon a schedule fixed at the time that the unit 130 is purchased. For example, the utilizable value of a benefit 200 may vary based on the length of time since the associated unit 130 was purchased. As another example, the utilizable value of a benefit 200 may vary based upon the age of account holder 114. As yet another example, the utilizable value of a benefit 200 may vary based upon the number of units 130 purchased or upon the number of units 130 exercised.

In certain embodiments, the utilizable value of one or more benefits 200 associated with a unit 130 may vary over time based upon an external index (or inflation) and/or upon the value of an underlying asset. For example, the utilizable value of a benefit 200 may vary based upon the Consumer Price Index and/or upon a health cost index. As another example, the utilizable value of a benefit 200 may vary based upon the market performance, or market value, of an underlying security or asset.

Thus, in certain embodiments, the ratios of utilizable value between the benefits 200 associated with a unit 130 may remain the same throughout the duration of benefits contract 100. Alternatively, in certain embodiments, the ratios of utilizable value between two or more benefits 200 associated with a unit 130 may change over time based on one or more of a plurality of factors, such as the age of the account holder, change in an index, and/or the time since the unit 130 was purchased. In some embodiments, the utilizable value may change for some benefits and be fixed for others.

In certain embodiments, the utilizable value of one or more benefits 200 may be based upon a lump sum value, a periodic payment over a fixed period of time, all or a portion of a certain category of expenses over a fixed period of time, all or a portion of a certain category of expenses over an indefinite period of time, and/or any combination of these. In certain embodiments, the utilizable value of one or more benefits 200 may be capped at a maximum total payout, at a maximum periodic payout, or a combination of these. In certain embodiments, the utilizable value of one or more benefits 200 may be based upon the value (or change in value) of one or more assets.

According to certain embodiments, benefits contract 100 (or applicable laws or regulations) may allow customer 110 to purchase units at different times and at different intervals. For example benefits contract 100 (or applicable laws or regulations) may allow customer 110 to purchase multiple units 130 simultaneously and/or to purchase units 130 a certain number at a time over an extended period of time. Certain embodiments of benefits contract 100 (or applicable laws or regulations) may also provide flexibility by allowing customer 110 to choose when to purchase units 130, how many units 130 to purchase, when to exercise units 130, and which benefits 200 associated with units 130 to elect. Certain embodiments of benefits contract 100 (or applicable laws or regulations) may simplify the decision making process for customer 110 in relation to purchasing multiple benefits 200 by allowing the customer to purchase units 130 representing multiple benefits 200. Certain embodiments of benefits contract 100 (or applicable laws or regulations) may also allow customer 110 to purchase units 130 and then wait to determine which benefits 200 associated with the purchased units 130 to utilize until a later time, such as when a need for a particular benefit 200 arises or is anticipated. Certain embodiments may also reduce the costs that issuer 120 may incur in providing multiple benefits 200 by limiting the time in which one or more of multiple benefits 200 may be utilized.

In certain embodiments, benefits contract 100 may provide that for one or more benefits 200 there may be an imposed delay between the date that the associated units 130 are purchased and the first date in which a particular benefit 200 may be elected. For example, in certain embodiments, a unit 130 may be purchased when account holder 114 is thirty years old and the unit 130 may be associated with three benefits 200 including lifetime income benefit 202, long-term disability benefit 208, and long-term care benefit 210. In this particular example, and not by way of limitation, the long-term disability benefit 208 and the long-term care benefit 210 may be elected immediately, but the lifetime income benefit 202 may not be elected until account holder 114 reaches a certain age, such as age sixty-five. Such delay before a benefit 200 may be executed may be the same for all, some, or none of the benefits 200 associated with a particular unit 130.

Similarly, in certain embodiments, benefits contract 100 may provide that for one or more benefits 200 there may be an imposed time limit after which date the one or more benefits 200 may not be elected. For example, in certain embodiments, a unit 130 may be purchased when account holder 114 is thirty years old and the unit may be associated with multiple benefits including at least long-term disability benefit 208 and long-term care benefit 210. In this particular example, and not by way of limitation, the long-term disability benefit 208 may be elected at any time beginning on the date of purchase and ending on the date that account holder 114 turns fifty-five years old. Such an imposed time limit in which a benefit may be elected may be the same for all, some, or none of the benefits 200 associated with a particular unit 130.

Issuer 120 may price benefits contract 100 and/or units 130 according to techniques the same as or similar to any of numerous well known pricing techniques. As an example, issuer 120 may offer benefits contract 100 at a price based upon the age and/or gender of account holder 114, one or more health variables for account holder 114, the number and type of benefits 200 covered by benefits contract 100, the number of units 130 ordered, and/or any other appropriate criteria. As another example, issuer 120 may price benefits contract 100 and/or units 130 at twice the market price for the most expensive of the benefits 200 covered. As yet another example, issuer 120 may price benefits contract 100 and/or units 130 at a price equal to the sum of the market prices for each of the benefits 200 covered. Any appropriate type of pricing could be used subject to applicable law or regulation.

In certain embodiments, benefits contract 100 (and/or units 130) may be tied to (and/or associated with) one or more assets. In these embodiments, the availability, cost, and/or value of benefits contract 100 (and/or units 130) may be related to the size and/or value of (or changes to the size and/or value of) the one or more assets. In certain embodiments, changes to the size and/or value of the one or more assets may be due to market changes for, distributions from, and/or contributions to the one or more assets.

Figure 3:
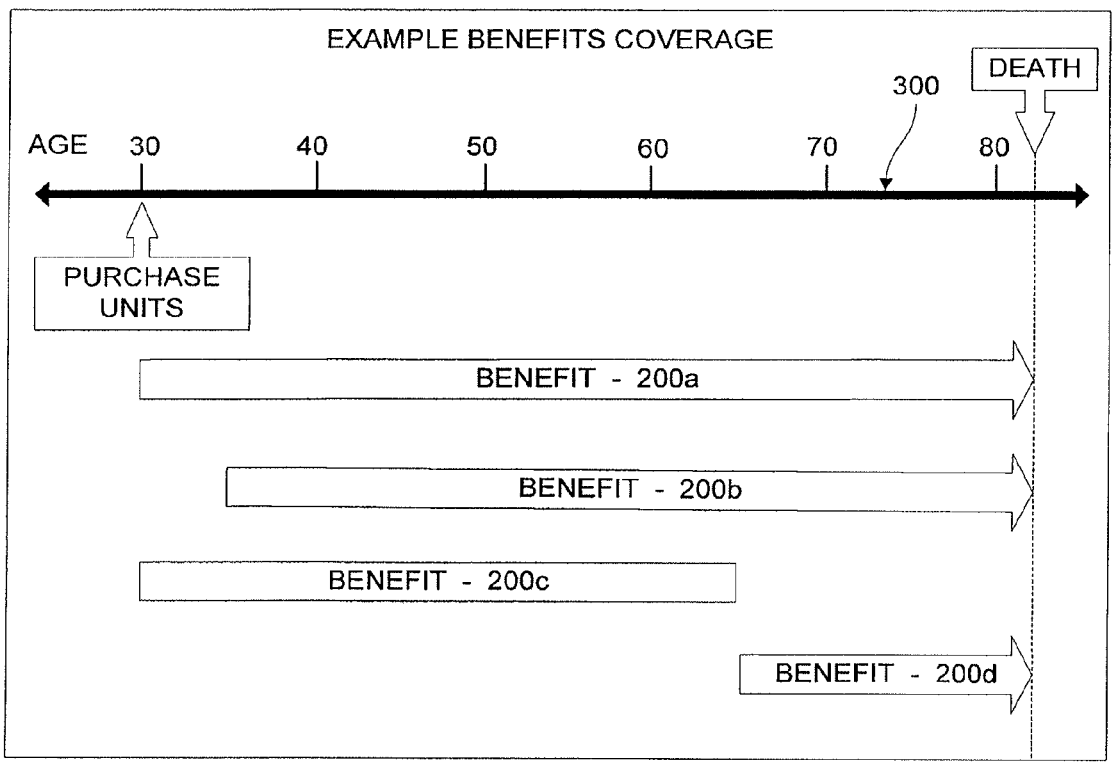
FIG. 3 illustrates an example timeline showing coverage times for different benefits according to a particular embodiment.

FIG. 3 illustrates an example timeline 300 showing coverage times for different benefits 200 according to a particular embodiment. In certain embodiments, benefits 200 associated with a unit 130 may have different coverage periods. For example, the coverage periods for different benefits 200 may have different start dates, different durations, and/or different end dates. In certain embodiments, start dates, end dates, and/or durations may be based upon the age of the account holder and/or the date that the units 130 were purchased.

In the example embodiment shown in FIG. 3, unit 130 is purchased when account holder 114 is thirty years old. Benefit 200*a* has a potential coverage period that begins on the purchase date for unit 130 and ends upon the death of account holder 114. Benefit 200*b* has a potential coverage period that begins five years after the purchase date for unit 130 and ends upon the death of account holder 114. Benefit 200*c* has a potential coverage period that begins on the purchase date for unit 130 and ends thirty-five years later when account holder is sixty-five years old. (In certain embodiments, the start date and/or the end date of one or more benefits 200 may be tied to the birthday of an account holder 114 or an anniversary of the purchase date of unit 130.) Benefit 200*d* has a potential coverage period that begins thirty-five years after unit 130 is purchased, when account holder 114 is sixty-five years old, and ends upon the death of account holder 114.

As an example, in certain embodiments, short-term disability benefit 206, long-term disability benefit 208, and life insurance 218 may be limited to election prior to a retirement age for account holder 114. As another example, in certain embodiments, lifetime income benefit 202 and withdrawal benefit 204 may be limited to election after a retirement age for account holder 114.

Figure 4:
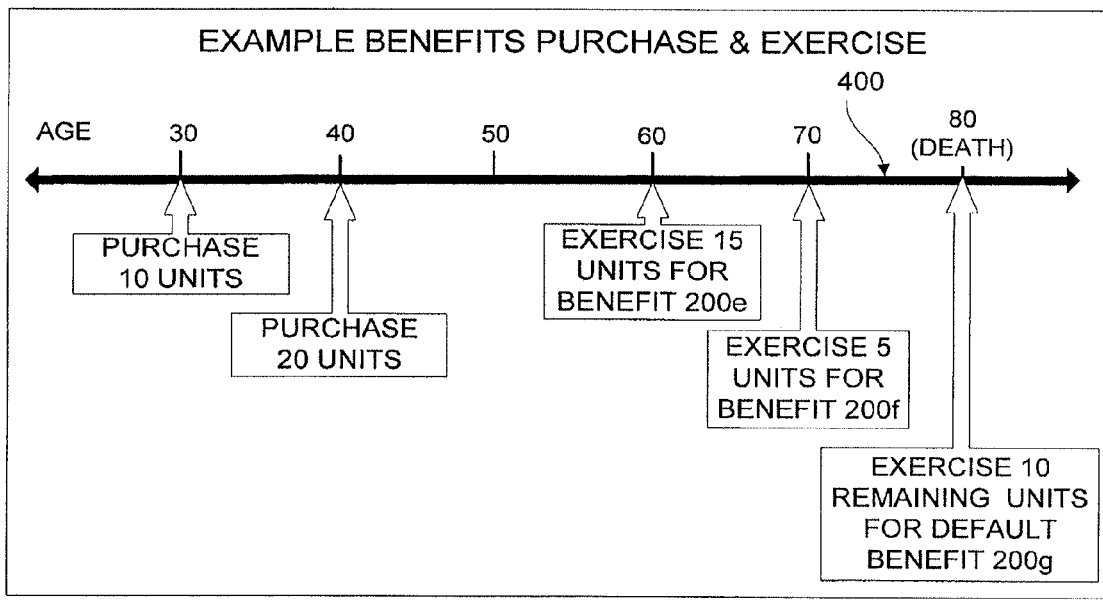
FIG. 4 illustrates an example timeline showing the purchase and exercise of units according to a particular embodiment.

FIG. 4 illustrates an example timeline showing the purchase and exercise of units 130 according to a particular embodiment. According to certain embodiments, units 130 may be purchased at different times and may be exercised at different times to utilize different benefits 200. According to certain embodiments, upon the death of account holder 114 purchased and unexercised units 130 may be exercised and utilized as a default benefit, such as life insurance benefit 218.

In the example embodiment shown in FIG. 4, ten units 130 are purchased when account holder 114 is thirty years old. An additional twenty units 130 are purchased when account holder 114 is forty years old. When account holder 114 is sixty years old, fifteen units 130 are exercised to utilize benefit 200*e*. When account holder 114 is seventy years old, five units 130 are exercised to utilize benefit 200*f*. Account holder 114 dies at the age of eighty. Upon the death of account holder 114, the remaining ten units 130 are exercised to utilize default benefit 200*g*.

Figure 5A:
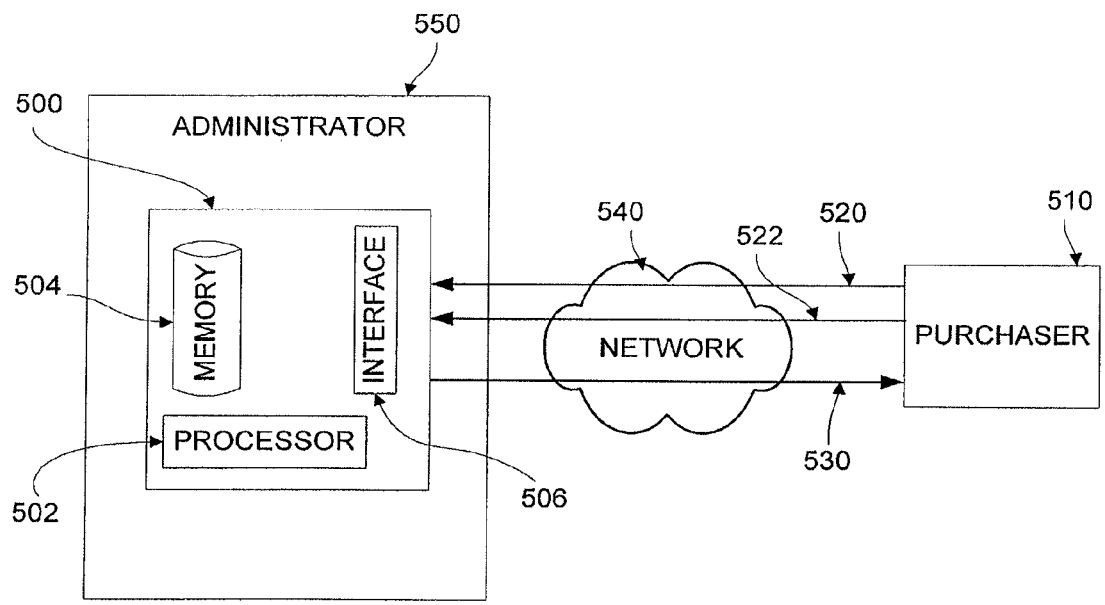
FIGS. 5A and 5B illustrate an example data processing system for providing a benefits contract according to a particular embodiment.
Figure 5B:
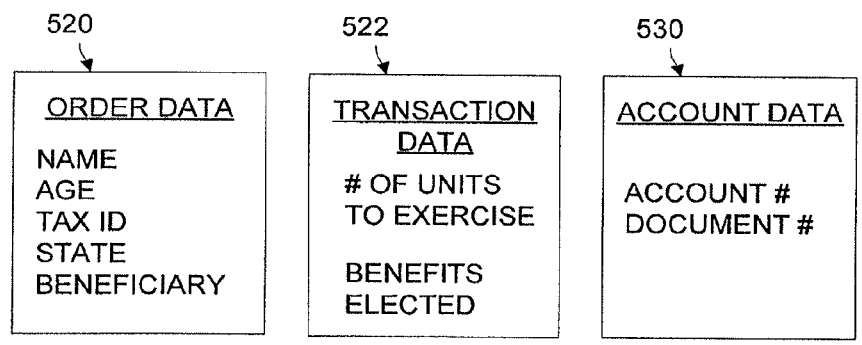

FIGS. 5A and 5B illustrate an example data processing system for administering and providing one or more benefits contracts 100 according to a particular embodiment. While in certain embodiments benefits contract 100 is entered into without using a computer, other embodiments may have a computerized option for entering into an agreement. Data processing system 500 represents hardware and controlling logic for administering and/or providing benefits contract 100. In the embodiment shown, data processing system 500 may include processing module 502, memory 504, and interface 506. As shown, data processing system 500 may be included as a system controlled by administrator 550. Although data processing system 500 is shown as a single system, data processing system 500 may be distributed across multiple platforms and housed in multiple locations, some or all of which may or may not be controlled by administrator 550.

Processing module 502 may control the operation and administration of elements within data processing system 500 by processing information received from interface 506 and memory 504. Processing module 502 may include any hardware and/or controlling logic elements operable to control and process information. For example, processing module 502 may be a computer, a programmable logic device, a microcontroller, and/or any other suitable device or group of devices.

Memory 504 may store, either permanently or temporarily, data and other information for processing by processing module 502 and communication using interface 506. Memory 504 may include any one or a combination of volatile or nonvolatile local or remote devices suitable for storing information. For example, memory 504 may include random access memory (RAM), read only memory (ROM), magnetic storage devices, optical storage devices, or any other suitable information storage device or combination of these devices. Memory 504 may store, among other things, order data 520, transaction data 522, and account data 530.

Interface 506 communicates information to and receives information from devices or systems coupled to data processing system 500. For example, interface 506 may communicate with other elements controlled by administrator 550, network 540, and/or elements coupled to network 540. Thus interface 506 may include any hardware and/or controlling logic used to communicate information to and from elements coupled to data processing system 500.

Network 540 represents communication equipment, including hardware and any appropriate controlling logic, for interconnecting elements coupled to network 540. Thus network 540 may represent a local area network (LAN), a metropolitan area network (MAN), a wide area network (WAN), and/or any other appropriate form of network. Furthermore, elements within network 540 may utilize circuit-switched, packet-based communication protocols and/or other communication protocols to provide for network communications. The elements within network 340 may be connected together via a plurality of fiber-optic cables, coaxial cables, twisted-pair lines, and/or other physical media for transferring communications signals. The elements within network 340 may also be connected together through wireless transmissions, including infrared transmissions, 802.11 protocol transmissions, laser line-of-sight transmissions, or any other appropriate wireless transmission method.

Administrator 550 represents an entity or group of entities that coordinate the administration of benefits contract 100. For example, administrator 550 may be issuer 120, an agent for issuer 120, or another third-party entity that operates as an outsourcing entity for the administration of benefits contract 100.

In operation, order data 520 and/or transaction data 522 may be transmitted from purchaser 510 to data processing system 500 through network 540. Data processing system 500 may process order data 520 and/or transaction data 522, generate account data 530, and transmit account data 530 to purchaser 510 through network 540. Purchaser 510 may represent one or more customers 110 or purchaser 510 may represent one or more agents or intermediaries acting on behalf of one or more customers 110.

Order data 520 may include the name and age of account holder 114, one or more tax identifiers, the resident state of account holder 114, and a designation of beneficiary 116. In certain embodiments, order data may also include a number of units 130 requested to be purchased, health history information, personal financial information, and gender. Transaction data 522 may include a number of units 130 to be exercised and the benefits 200 elected to be utilized. Account data 330 may include an account number and a document, or reference to a document, containing the provisions of benefits contract 100. In certain embodiments, account data 530 may also include status information for benefits contract 100. For example, account data 530 may include the number of purchased units 130, the coverage periods for each benefit 200, and/or the potential coverage value for each benefit 200 based on the number of purchased units 130.

According to an example embodiment, upon receipt of order data 520, data processing system 500 may calculate any applicable fees associated with the provisions of benefits contract 100 and/or units 130. Data processing system may also determine an identifier, such as an account number associated with benefits contract 100, and identify benefits 200 associated with units 130. Data processing system 500 may generate account data 530 and transmit account data 530 to purchaser 510 through the use of network 540. According to an example embodiment, upon receipt of transaction data 522, data processing system 500 may update account data 530. For example, data processing system 500 may update status information associated with benefits contract 100, such as the number of unexercised units 130, and/or the potential coverage value for each benefit 200 based on the number of unexercised units 130.

In certain embodiments, purchaser 510 may initiate the transmission of order data 520 and/or transaction data 522 through the use of a web-based application. For example, purchaser 510 may access one or more websites and may submit certain portions of order data using those websites. Similarly, purchaser 510 may utilize one or more electronic fund transfer (EFT) technologies to purchase benefits contract 100. The use of Internet technologies to purchase benefits contract 100 may involve the use of one or more security provisions such as digital signatures, digital certificates, passwords, and encryptions. In certain embodiments, the collection of order data 520 and/or transaction data 522 may occur through the use of an interactive process. For example, a web-based application may present a series of questions to purchaser 510, which purchaser 510 may respond to and, in responding, submit the contents of order data 520.

Figure 6:
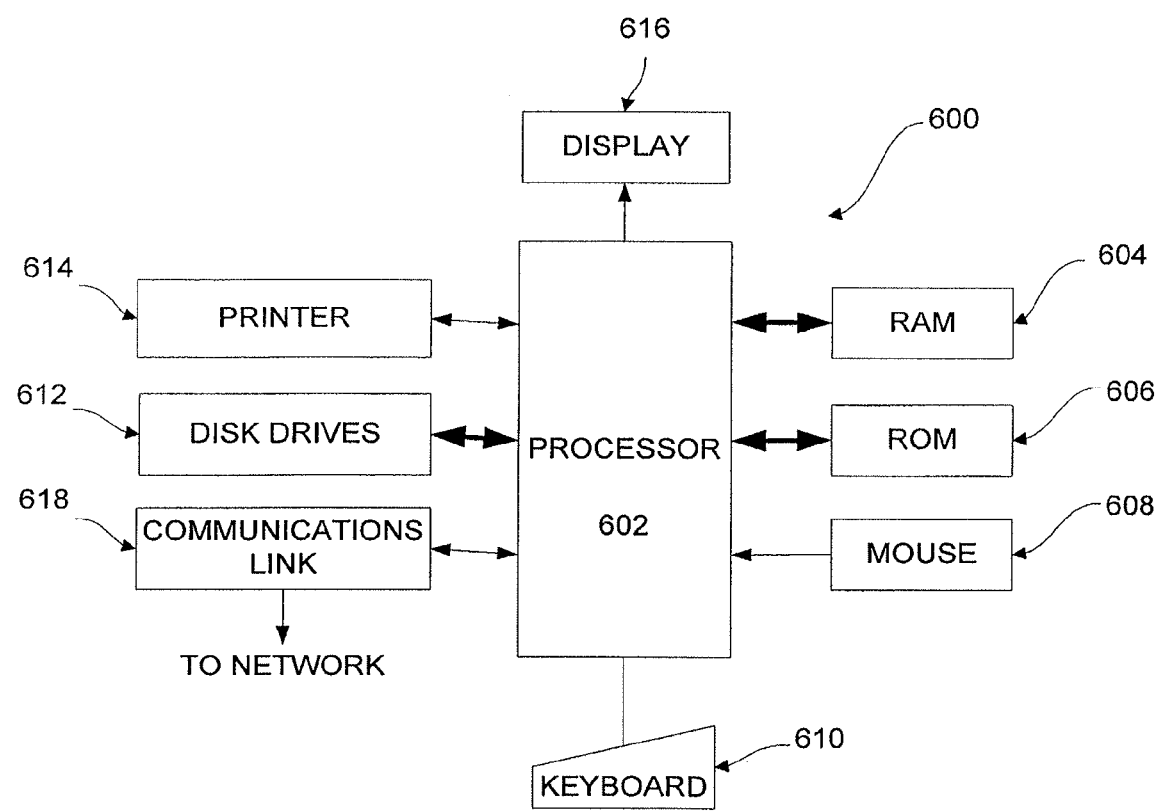
FIG. 6 illustrates an embodiment of a general purpose computer.

FIG. 6 is an embodiment of a general purpose computer 600 that may be used in connection with one or more pieces of software used to implement the invention. General purpose computer 600 may generally be adapted to execute any of the well-known OS2, UNIX, Mac-OS, Linux, and Windows Operating Systems or other operating systems. The general purpose computer 600 in this embodiment comprises a processor 602, a random access memory (RAM) 604, a read only memory (ROM) 606, a mouse 608, a keyboard 610 and input/output devices such as a printer 614, disk drives 612, a display 616 and a communications link 618. In other embodiments, the general purpose computer 600 may include more, less, or other component parts. Embodiments of the present invention may include programs that may be stored in the RAM 604, the ROM 606 or the disk drives 612 and may be executed by the processor 602. The communications link 618 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 612 may include a variety of types of storage media such as, for example, floppy disk drives, hard disk drives, CD ROM drives, DVD ROM drives, magnetic tape drives or other suitable storage media.

Although FIG. 6 provides one embodiment of a computer that may be used with the invention, the invention may additionally utilize computers other than general purpose computers as well as general purpose computers without conventional operating systems. Additionally, embodiments of the invention may also employ multiple general purpose computers 600 or other computers networked together in a computer network. Most commonly, multiple general purpose computers 600 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 6, the logic comprises computer software executable on the general purpose computer 600. The medium may include the RAM 604, the ROM 606 or the disk drives 612. In other embodiments, the logic may be contained within hardware configurations or a combination of software and hardware configurations. The logic may also be embedded within any other suitable medium without departing from the scope of the invention.

Although the present invention has been described in several embodiments, a plenitude of changes and modifications may be suggested to one skilled in the art, and it is intended that the present invention encompass such changes and modifications as fall within the present appended claims.

To aid the Patent Office, and any readers of any patent issued on this application in interpreting the claims appended hereto, applicants wish to note that they do not intend any of the appended claims to invoke ¶ 6 of 35 U.S.C. §112 as this paragraph and section exists on the date of filing hereof unless "means for" or "step for" are used in the particular claim.

What is claimed is:

1. A data processing system configured to manage a benefits account, the data processing system comprising:
    one or more memory devices;
    one or more processing modules; and
    software embodied in the one or more memory devices and configured, when executed by the one or more processing modules, to:
        receive order data representing a number of benefits units requested to be purchased, the order data received on a purchase date, the benefits units being associated with a plurality of benefits according to provisions of a benefits contract, wherein each benefits unit is discretionarily exercisable at a later date towards at least one of the plurality of benefits, wherein for each benefits unit purchased a utilizable value of each one of the plurality of benefits is defined at the time that the benefits unit is purchased, and wherein the plurality of benefits comprises:
            one or more from the first group consisting of:
                a plurality of income payments; and
                a withdrawal benefit; and
            one or more from the second group consisting of:
                a disability insurance;
                a long-term care insurance;
                a prescription drug coverage;
                a health care coverage; and
                a supplemental health care coverage;
        store, in the one or more memory devices, account data representing a number of benefits units purchased;
        receive transaction data representing a request to exercise a specified number of the purchased benefits units towards a specified one of the plurality of benefits;
        generate status information identifying a coverage period provided at least in part by exercise of the specified number of the purchased benefits units towards the specified one of the plurality of benefits;
        transmit the status information through a network;
        in response to the death of an account holder:
            determine that one or more of the purchased benefit units have not been exercised;
            automatically exercise the one or more unexercised benefit units towards a retroactive life insurance policy on the account holder, the retroactive life insurance policy providing a financial benefit for transfer to a beneficiary designated by the account holder in the benefits contract; and
            transfer the financial benefit provided by the retroactive life insurance policy to the beneficiary.

2. The data processing system of claim 1, wherein:
    the specified one of the plurality of benefits is the plurality of income payments;
    the identified coverage period is a lifetime of a designated life; and
    the software is further configured, when executed by the one or more processing modules, to transfer on a periodic basis the plurality of income payments during the lifetime of the designated life, the plurality of income payments being transferred in response to exercise of the specified number of benefits towards the plurality of income payments.

3. The data processing system of claim 1, wherein:
    the specified one of the plurality of benefits is the supplemental health care coverage; and
    the identified coverage period comprises:
        a start date when the supplemental health care coverage begins; and
        a stop date when the supplemental health care coverage terminates.

4. The data processing system of claim 1, wherein the software is further configured, when executed by the one or more processing modules, to update the account data representing the number of benefits units purchased, the update based on the received transaction data.

5. The data processing system of claim 1, wherein the software is further configured, when executed by the one or more processing modules, to:
    in response to the received order data, calculate a sum of the number of benefits units stored in the one or more memory devices and the number of benefits units requested to be purchased.

6. The data processing system of claim 1, wherein the generated status information further identifies a maximum coverage value for the specified one of the plurality of benefits.

7. A method for managing a benefits account, the method comprising:
    receiving order data representing a number of benefits units requested to be purchased, the order data received on a purchase date, the benefits units associated with a plurality of benefits according to provisions of a benefits contract, wherein each benefits unit is discretionarily exercisable at a later date towards at least one of the plurality of benefits, wherein for each benefits unit purchased a utilizable value of each one of the plurality of benefits is defined at the time that the benefits unit is purchased and wherein the plurality of benefits comprises:
        one or more from the first group consisting of:
            a plurality of income payments; and
            a withdrawal benefit; and
        one or more from the second group consisting of:
            a disability insurance;
            a long-term care insurance;
            a prescription drug coverage;
            a health care coverage; and
            a supplemental health care coverage;
    storing, in one or more memory devices, account data representing a number of benefits units purchased;
    receiving, at a data processing system, transaction data representing a request to exercise a specified number of the purchased benefits units towards a specified one of the plurality of benefits;
    using the data processing system, generating status information identifying a coverage period provided at least in part by exercise of the specified number of the purchased benefits units towards the specified one of the plurality of benefits;

using the data processing system, transmitting the status information through a network;

in response to the death of an account holder:

using the data processing system, determining that one or more of the purchased benefit units have not been exercised;

using the data processing system, automatically exercising the one or more unexercised benefit units towards a retroactive life insurance policy on the account holder, the retroactive life insurance policy providing a financial benefit for transfer to a beneficiary designated by the account holder in the benefits contract; and using the data processing system, transferring the financial benefit provided by the retroactive life insurance policy to the beneficiary.

8. The method of claim 7, wherein:
the specified one of the plurality of benefits is the plurality of income payments; and
the identified coverage period is a lifetime of a designated life.

9. The method of claim 8, further comprising, transferring on a periodic basis the plurality of income payments during the lifetime of the designated life, the plurality of income payments being transferred using the data processing system and in response to exercise of the specified number of benefits towards the plurality of income payments.

10. The method of claim 7, wherein:
the specified one of the plurality of benefits is the supplemental health care coverage; and
the identified coverage period comprises:
a start date when the supplemental health care coverage begins; and
a stop date when the supplemental health care coverage terminates.

11. The method of claim 7, further comprising, using the data process system and in response to the received transaction data, updating the account data representing the number of benefits units purchased.

12. The method of claim 7, further comprising
using the data processing system and in response to the received order data, calculating a sum of the number of benefits units stored in the one or more memory devices and the number of benefits units requested to be purchased.

13. The method of claim 7, wherein the generated status information further identifies a maximum coverage value for the specified one of the plurality of benefits.

14. Software embodied in a tangible computer-readable medium and configured, when executed by one or more processing modules, to:
receive order data representing a number of benefits units requested to be purchased, the order data received on a purchase date, the benefits units being associated with a plurality of benefits according to provisions of a benefits contract, wherein each benefits unit is discretionarily exercisable at a later date towards at least one of the plurality of benefits, wherein for each benefits unit purchased a utilizable value of each one of the plurality of benefits is defined at the time that the benefits unit is purchased, and wherein the plurality of benefits comprises:
one or more from the first group consisting of:
a plurality of income payments; and
a withdrawal benefit; and
one or more from the second group consisting of:
a disability insurance;
a long-term care insurance;
a prescription drug coverage;
a health care coverage; and
a supplemental health care coverage;
store, in one or more memory devices, account data representing a number of benefits units purchased;
receive transaction data representing a request to exercise a specified number of the purchased benefits units towards a specified one of the plurality of benefits;
generate status information identifying a coverage period provided at least in part by exercise of the specified number of the purchased benefits units towards the specified one of the plurality of benefits;
transmit the status information through a network;
in response to the death of an account holder:
determine that one or more of the purchased benefit units have not been exercised;
automatically exercise the one or more unexercised benefit units towards a retroactive life insurance policy on the account holder, the retroactive life insurance policy providing a financial benefit for transfer to a beneficiary designated by the account holder in the benefits contract; and
transfer the financial benefit provided by the retroactive life insurance policy to the beneficiary.

15. The software of claim 14, wherein:
the specified one of the plurality of benefits is the plurality of income payments;
the identified coverage period is a lifetime of a designated life; and
the software is further configured, when executed by the one or more processing modules, to transfer on a periodic basis the plurality of income payments during the lifetime of the designated life, the plurality of income payments being transferred in response to exercise of the specified number of benefits towards the plurality of income payments.

16. The software of claim 14, wherein:
the specified one of the plurality of benefits is the supplemental health care coverage; and
the identified coverage period comprises:
a start date when the supplemental health care coverage begins; and
a stop date when the supplemental health care coverage terminates.

17. The software of claim 14, further configured, when executed by the one or more processing modules, to update the account data representing the number of benefits units purchased, the update based on the received transaction data.

18. The software of claim 14, further configured, when executed by the one or more processing modules, to:
in response to the received order data, calculate a sum of the number of benefits units stored in the one or more memory devices and the number of benefits units requested to be purchased.

19. The software of claim 14, wherein the generated status information further identifies a maximum coverage value for the specified one of the plurality of benefits.

20. A data processing system configured to manage a benefits account, the data processing system comprising:
one or more memory devices;
one or more processing modules; and
software embodied in the one or more memory devices and configured, when executed by the one or more processing modules, to:
receive order data representing a number of benefits units requested to be purchased, the order data received on a purchase date, the benefits units being associated with a plurality of benefits according to provisions of a benefits contract, wherein each benefits unit is discretionarily exercisable at a later date towards at least one of the plurality of benefits, wherein for each benefits unit purchased a utilizable value of each one of the plurality of benefits is defined at the time that the benefits unit is purchased, and wherein the plurality of benefits comprises:
  one or more from the first group consisting of:
    a plurality of income payments; and
    a withdrawal benefit; and
  one or more from the second group consisting of:
    a disability insurance;
    a long-term care insurance;
    a prescription drug coverage;
    a health care coverage; and
    a supplemental health care coverage;
store, in the one or more memory devices, account data representing a number of benefits units purchased;
receive transaction data representing a first request to exercise a first specified number of the purchased benefits units towards a specified one of the plurality of benefits from the first group;
receive transaction data representing a second request to exercise a second specified number of the purchased benefits units towards a specified one of the plurality of benefits from the second group;
generate status information identifying:
  a first coverage period provided at least in part by exercise of the first specified number of the purchased benefits units towards the specified one of the plurality of benefits from the first group; and
  a second coverage period provided at least in part by exercise of the second specified number of the purchased benefits units towards the specified one of the plurality of benefits from the second group;
transmit the status information through a network;
in response to the death of an account holder:
  determine that one or more of the purchased benefit units has not been exercised;
  automatically exercise the one or more unexercised benefit units towards a retroactive life insurance policy on the account holder, the retroactive life insurance policy providing a financial benefit for transfer to a beneficiary designated by the account holder in the benefits contract; and
  transfer the financial benefit provided by the retroactive life insurance policy to the beneficiary.

21. A method for managing a benefits account, the method comprising:
receiving order data representing a number of benefits units requested to be purchased, the order data received on a purchase date, the benefits units associated with a plurality of benefits according to provisions of a benefits contract, wherein each benefits unit is discretionarily exercisable at a later date towards at least one of the plurality of benefits, wherein for each benefits unit purchased a utilizable value of each one of the plurality of benefits is defined at the time that the benefits unit is purchased and wherein the plurality of benefits comprises:
  one or more from the first group consisting of:
    a plurality of income payments; and
    a withdrawal benefit; and
  one or more from the second group consisting of:
    a disability insurance;
    a long-term care insurance;
    a prescription drug coverage;
    a health care coverage; and
    a supplemental health care coverage;
storing, in one or more memory devices, account data representing a number of benefits units purchased;
receiving, at a data processing system, transaction data representing a first request to exercise a first specified number of the purchased benefits units towards a specified one of the plurality of benefits from the first group;
receiving, at the data processing system, transaction data representing a second request to exercise a second specified number of the purchased benefits units towards a specified one of the plurality of benefits from the second group;
using the data processing system, generating status information identifying:
  a first coverage period provided at least in part by exercise of the first specified number of the purchased benefits units towards the specified one of the plurality of benefits from the first group; and
  a second coverage period provided at least in part by exercise of the second specified number of the purchased benefits units towards the specified one of the plurality of benefits from the second group;
using the data processing system, transmitting the status information through a network;
in response to the death of an account holder:
  using the data processing system, determining that one or more of the purchased benefit units has not been exercised;
  using the data processing system, automatically exercising the one or more unexercised benefit units towards a retroactive life insurance policy on the account holder, the retroactive life insurance policy providing a financial benefit for transfer to a beneficiary designated by the account holder in the benefits contract; and
  using the data processing system, transferring the financial benefit provided by the retroactive life insurance policy to the beneficiary.

22. Software embodied in a tangible computer-readable medium and configured, when executed by one or more processing modules, to:
receive order data representing a number of benefits units requested to be purchased, the order data received on a purchase date, the benefits units being associated with a plurality of benefits according to provisions of a benefits contract, wherein each benefits unit is discretionarily exercisable at a later date towards at least one of the plurality of benefits, wherein for each benefits unit purchased a utilizable value of each one of the plurality of benefits is defined at the time that the benefits unit is purchased, and wherein the plurality of benefits comprises:
  one or more from the first group consisting of:
    a plurality of income payments; and
    a withdrawal benefit; and
  one or more from the second group consisting of:
    a disability insurance;
    a long-term care insurance;
    a prescription drug coverage;
    a health care coverage; and
    a supplemental health care coverage;
store, in one or more memory devices, account data representing a number of benefits units purchased;

receive transaction data representing a first request to exercise a first specified number of the purchased benefits units towards a specified one of the plurality of benefits from the first group;
receive transaction data representing a second request to exercise a second specified number of the purchased benefits units towards a specified one of the plurality of benefits from the second group;
generate status information identifying:
- a first coverage period provided at least in part by exercise of the first specified number of the purchased benefits units towards the specified one of the plurality of benefits from the first group; and
- a second coverage period provided at least in part by exercise of the second specified number of the purchased benefits units towards the specified one of the plurality of benefits from the second group;

transmit the status information through a network;
in response to the death of an account holder:
- determine that one or more of the purchased benefit units has not been exercised;
- automatically exercise the one or more unexercised benefit units towards a retroactive life insurance policy on the account holder, the retroactive life insurance policy providing a financial benefit for transfer to a beneficiary designated by the account holder in the benefits contract; and
- transfer the financial benefit provided by the retroactive life insurance policy to the beneficiary.

* * * * *